United States Patent [19]

Dole

[11] Patent Number: 5,555,019
[45] Date of Patent: Sep. 10, 1996

[54] MINIATURE VEHICLE VIDEO PRODUCTION SYSTEM

[76] Inventor: Kevin Dole, 23427 Park Hacienda, Calabasas, Calif. 91302-1718

[21] Appl. No.: 401,932

[22] Filed: Mar. 9, 1995

[51] Int. Cl.$^6$ ...................................................... H04N 7/18
[52] U.S. Cl. .......................... 348/148; 348/158; 348/211
[58] Field of Search ............................... 348/82, 143, 148, 348/158, 211; H04N 7/18

[56] References Cited

U.S. PATENT DOCUMENTS

| | | | |
|---|---|---|---|
| 3,504,122 | 3/1970 | Ratliff | 348/211 |
| 5,008,804 | 4/1991 | Gordon | 348/373 |
| 5,251,673 | 10/1993 | Adachi | 348/88 |
| 5,448,290 | 9/1995 | VanZeeland | 348/153 |

*Primary Examiner*—Howard W. Britton
*Attorney, Agent, or Firm*—Welsh & Katz, Ltd.

[57] ABSTRACT

The toy vehicle video production system for creating full-motion real time video images of a toy target vehicle includes a toy vehicle, a first wireless transmitter, and a first wireless receiver operatively coupled to the toy vehicle and configured to control movement of the toy vehicle in response to signals received from the first wireless transmitter. A video camera mounted to the toy vehicle generates real-time video images of the toy target vehicle while a camera controller connected to the video camera controls movement of the video camera relative to the toy vehicle. The invention also includes a second wireless transmitter and a second wireless receiver operatively coupled to the camera motion controller and configured to control movement of video camera in response to signals received from the second wireless transmitter. A video recorder operatively coupled to the video camera records the real time video images generated by the video camera and a video display device operatively coupled to the video camera displays the real time video images. Movement of the toy vehicle and movement of the video camera are controlled in real time in response to the video images displayed on the display device so that optimal video images of the toy target vehicle are obtained.

19 Claims, 3 Drawing Sheets

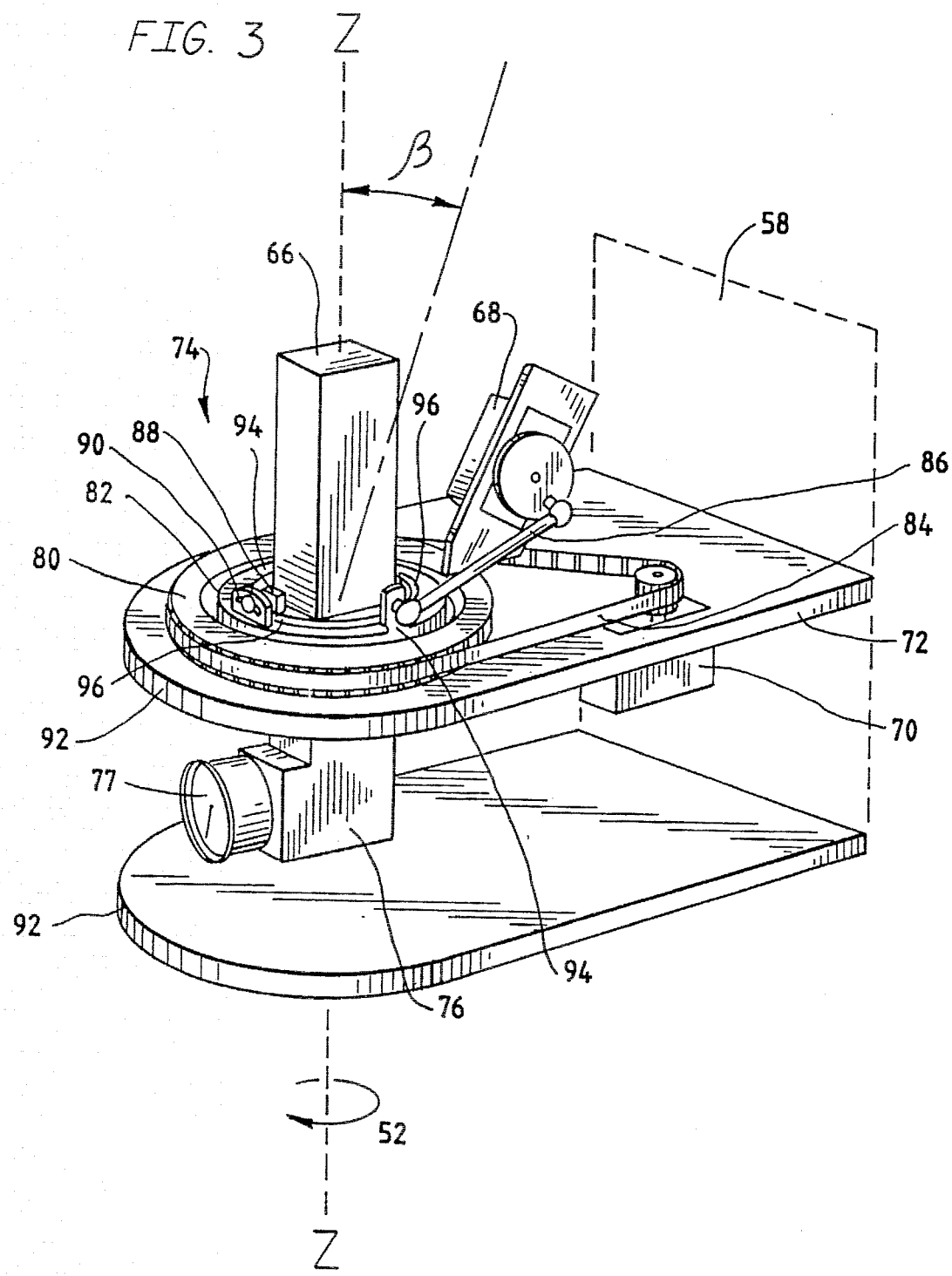

MINIATURE VEHICLE VIDEO PRODUCTION SYSTEM

BACKGROUND OF THE INVENTION

This invention relates to remotely controlled miniature or toy vehicles and more particularly to a radio controlled miniature vehicle having a video camera for transmitting real time video images.

Throughout the history of motion image production, such as video production and film-making, directors and producers have attempted to transport cameras along with moving subjects or targets to create images with the greatest emotional impact and realism. For example, if a runaway truck is shown careening down a steep mountain road, the viewer experiences greater suspense if the action is viewed from the front of the truck where the camera remains just ahead of the truck, rather than from a fixed position at the side of the road. Typically, a camera is mounted to the rear of a vehicle that remains in front of the truck at all times.

To achieve such realistic effects, movie engineers and technicians have created camera cars which are typically full-size vehicles to which platforms have been mounted. Various forms of rigging securely fix cameras and personnel to the platform while the camera car travels at high speeds following the subject.

Small, rapidly moving subjects, such as remote controlled toy vehicles and cars, are too small to effectively film or "shoot" in this manner. Miniature cars may travel at speeds up to fifteen miles per hour and are extremely agile and able to change direction quickly. The speed and agility of miniature race cars combined with their small size of approximately six to twenty-four inches in length, make action photography extremely difficult.

Various techniques have been used to produce such action photography, but each have significant limitations. It is known to place a camera and a human operator on a dolly or other movable platform and push the dolly so as to follow the subject. However, the size and weight requirements of this technique severely limit speed and maneuverability. Additionally, when filming a small toy vehicle the subject can only be seen from a downward angle thus, diminishing the presentation's dramatic impact and realism.

Mounting the camera and operator on a compact vehicle, such as an electric golf cart, increases the speed at which the camera and operator may travel, but speed and maneuverability are still severely limited. Available camera angles are also limited.

Another approach is to construct a long raised platform for the target toy car which follows a path parallel to the path travelled by the golf cart. This permits the camera lens to be positioned at a low point relative to the subject such that more dramatic camera angles may be used. However, this technique limits the subject to traveling along a single path and also limits the camera to recording the subject from only one side in any single shot. Construction of such ramps or paths are expensive and time consuming.

No known methods of shooting subjects such as remote controlled toy cars have been able to record continuous live-action images leading or following a subject vehicle where the target vehicle is able to travel under low-clearance obstacles and through tunnels and bridges.

Accordingly, it is an object of the present invention to provide a system for creating video images of a toy target vehicle.

It is another object of the present invention to provide a system for creating video images of a toy target vehicle where the video images are remotely transmitted to a base station.

It is a further object of the present invention to provide a system for creating video images of a toy target vehicle where the video camera is carried by a toy vehicle and remotely controlled.

It is yet another object of the present invention to provide a video image production system where the camera car, the camera, and the target car are controlled by wireless devices.

SUMMARY OF THE INVENTION

The disadvantages of existing video production systems are substantially overcome by the present invention by providing a toy vehicle video production system that remotely transmits real time video images from a camera mounted to a toy race car.

The present invention allows the camera to track the target vehicle and allows the camera to move as fast and be as maneuverable as the target itself. This makes possible the recording of images of small quickly moving objects having the same emotional impact as when full-size camera cars photograph full-size moving vehicles. The present invention permits initial shooting of the target toy car from one side where the camera is able to cross over in front of the target vehicle to continue shooting the target vehicle from the opposite side.

Control of the camera car, the camera, and the target vehicle is performed remotely such that the entire operation of the invention is wireless. Thus, the invention may be used to follow the target under low-clearance obstacles and through tunnels and bridges.

The present invention allows the camera lens to be placed as low as 0.5 inches above the ground and allows a camera operator to remotely pan and tilt the camera while the camera is propelled at high speeds along the ground in any direction. The present invention makes possible the recording of extremely exciting and realistic full motion video images of toy race cars from the perspective of a camera car racing therealong.

More specifically, the toy vehicle video production system for creating full-motion real time video images of a target vehicle includes a toy vehicle, a first wireless transmitter, and a first wireless receiver operatively coupled to the toy vehicle and configured to control movement of the toy vehicle in response to signals received from the first wireless transmitter.

A video camera is attached to the toy vehicle for generating real-time video images of the toy target vehicle while a camera motion controller connected to the video camera controls movement of the video camera relative to the toy vehicle. The invention also includes a second wireless transmitter and a second wireless receiver operatively coupled to the camera motion controller and configured to control movement of video camera in response to signals received from the second wireless transmitter.

A video recorder operatively coupled to the video camera records the real time video images generated by the video camera and a video display device operatively coupled to the video camera displays the real time video images. Movement of the toy vehicle and movement of the video camera are controlled in real time in response to the video images displayed on the video display device so that optimal video images of the toy target vehicle are obtained.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 3 is a perspective view of a camera module according to one embodiment of the present invention.

DETAILED DESCRIPTION OF THE INVENTION

Figure 1:
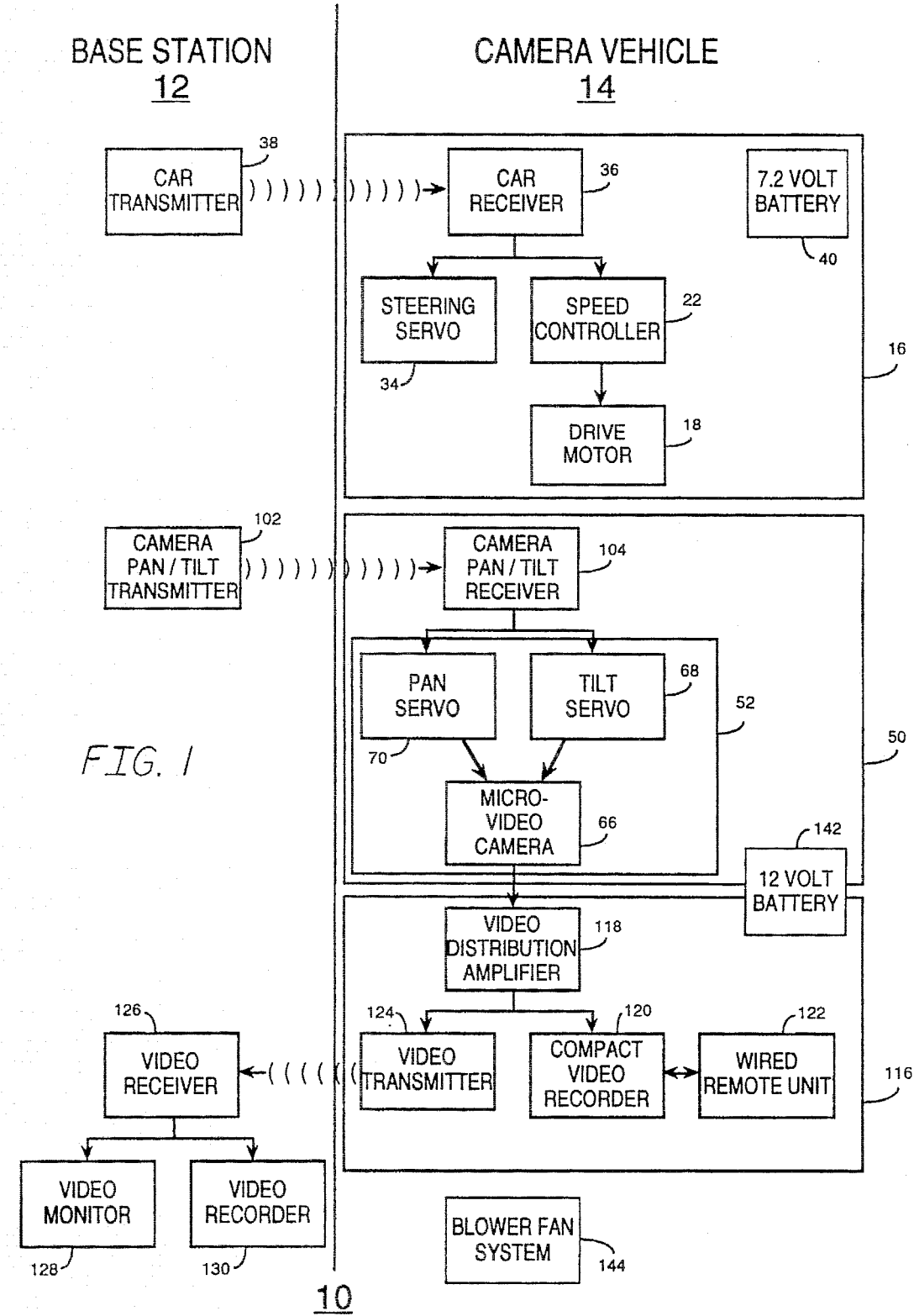
FIG. 1 is a block diagram of the main components of the system according to one embodiment of the present invention.
Figure 2:
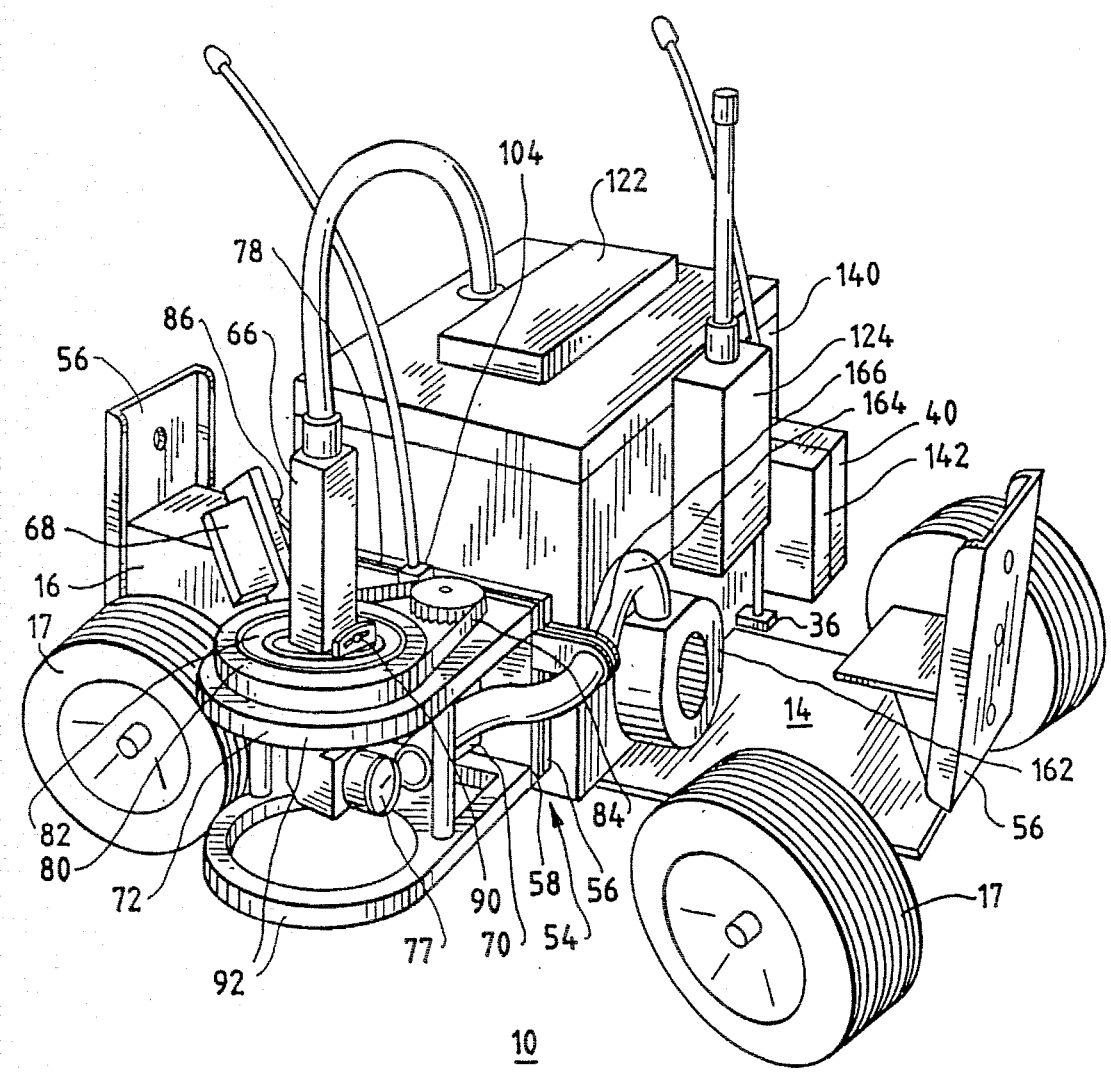
FIG. 2 is a pictorial diagram according to one embodiment of the present invention.

Referring now to FIGS. 1 and 2, the system is shown generally as 10. The system 10 includes devices which are located at a stationary point referred to as a base station 12. Devices which are mobile, that is, move relative to the base station 12, are incorporated into a camera vehicle 14 which may be referred to as a race car, a car, or a camera car. The vehicle which is the subject of the filming or photography is referred to as the subject car or target car (not shown).

The race car 14 for example, may be constructed from an XXT off-road remote controlled car kit manufactured by Team Lossi Corporation. The car 14 includes a propulsion subsystem 16, shown in dashed lines, and wheels 17. The propulsion subsystem 16 includes a drive motor 18 for supplying mechanical rotation to the wheels 17. The drive motor 18 is controlled by a speed controller 22 which adjusts voltage to the drive motor thus, affecting speed and forward-reverse direction. The drive motor 18 for example, may be a Model Turbo-05 manufactured by Airtronics Corporation while the speed controller 22 for example, may be a model 610-R speed controller manufactured by Novak Corporation. The car kit includes basic parts of a race car such as the wheels 17, kit suspension devices (not shown), chassis, and body. All electric components may be added to the car kit to provide the propulsion subsystem 16, as is well known by those skilled in the art.

A steering servo motor 34 provides directional control to the car 14 by altering the angle of the front wheels 17 relative to the longitudinal axis of the vehicle, as is similar in concept to the steering system of full-size vehicles. This mechanically adjusts the wheels 17 of the car 14. The steering servo motor 34 may for example, be a Model S9304 steering servo motor manufactured by Futaba Corporation.

The steering servo motor 34 and the speed controller 22 are both responsive to a wireless car receiver 36 which receives commands from a wireless car transmitter 38 located at the base station 12. The car receiver 36 and transmitter 38 may for example, be a Model PCM 1024 radio controlled receiver-transmitter manufactured by Futaba Corporation.

The car transmitter 38 uses radio frequency energy to remotely transmit commands to the car receiver 36 where commands entered by an operator at the base station 12 are transmitted to the car receiver 36. These commands are then directed to the speed controller 22 and the steering servo motor 34 to remotely control the speed and direction of the race car 14. A 7.2 volt rechargeable battery pack 40 may be formed from six ganged batteries, such as six Sanyo 1400 milliamp 1.2 volt nickel-cadmium batteries. The battery pack 40 supplies electrical power to the propulsion subsystem 16 and is mounted within the car 14.

The car transmitter 38, car receiver 36, steering servo motor 34, speed controller 22, drive motor 18, and 7.2 volt battery pack 40 are added to the manufacture's race car kit as is well known in the art. Thus, the present invention uses the basic model race car described above as a platform.

A camera subsystem 50, shown in dashed lines, includes a camera module 52 also shown in dashed lines, which may be attached to the car 14 by means of a break-away mounting mechanism 54. The break-away mounting mechanism 54 is provided to protect the camera module 52 should the car 14 or the camera module 52 be subject to excessive force, such as if the car impacts an object or if the camera module impacts an object. This may minimize damage to components mounted on the camera module 52.

Four fixed mounting plates 56, one located on each side of the car 14, allow the camera module 52 to be attached to any side of the vehicle. The camera module 52 includes a break-away plate 58 which corresponds to the fixed mounting plate 56 attached to the car 14. The break-away mounting plate 58 may be releasably attached to the fixed mounting plate 56 by means well known to those skilled in the art.

For example, powerful magnets mounted to the fixed plate 56 and the break-away plate 58 may provide sufficient holding force to secure the camera module 52. Rigid fasteners, such as breakable rivets or bolts, having a predetermined breaking point may also be used. Additionally, industrial strength VELCRO or other similar connecting material may be used. Alternatively, the camera module 52 may be permanently mounted to the car without any break-away mechanism where protective bumpers or a protective cage may protect it from impact.

The camera module 52 includes a miniature video camera 66, such as a Model XC-999 miniature camera manufactured by Sony Corporation, and two servo motors (tilt servo motor 68 and pan servo motor 70) to provide tilt and pan capabilities for the camera. The pan servo motor 70 may for example, be a Model FPS- 132H servo motor while the tilt servo motor 68 may for example, be a model S-9601 servo motor, both manufactured by Futaba Corporation. The servo motors 68, 70 and the camera 66 are mounted on a base plate 72 constructed from plastic, metal, or other suitable material. The base plate 72 is fixed to the break-away plate 58 at substantially right angles. The base plate 72 includes a rotatable aperture mechanism 74 through which a right-angle lens portion 76 of the camera 66 projects. The aperture mechanism 74 allows the camera 66 mounted therein to tilt and rotate (pan) relative to the car 14. The tilt servo motor 68 allows the camera 66 to be tilted within the rotatable aperture mechanism 74 at an angle relative to the ground. Similarly, the pan servo motor 70 permits the camera 66 to be rotated within the rotatable aperture mechanism 74.

The right-angle lens portion 76 allows the subject to be shot at a height as low as 0.50 inches from ground level since a lens portion 77 is also at the same height. All wiring connecting the camera module 52 to the car 14 is also provided with break-away wiring connectors 78 so that if the camera module 52 should separate from the car, the wiring releasably separates so that no damage is incurred. Such mounting of the camera 66 and break-away wiring connectors 78 are well known by those skilled in the art.

Referring now to FIGS. 1 and 3, FIG. 3 illustrates the aperture mechanism 74 of the camera module 52. To permit the video camera 66 to tilt and pan, the aperture mechanism 74 includes a pan mount 80, a tilt mount 82, a pan drive belt 84, a tilt tie rod 86, a manual roll adjustment 88, and a manual roll mount 90. Additionally, as described above, protective bumpers 92 may be used to protect the components from impact in place of the break-away mounting mechanism 54 (FIG. 2).

Pan capability allows the video camera 66 to rotate around an axis perpendicular to the base plate 72, as shown by a reference letter "Z." The pan mount 80 is a circular ring rotatably mounted within the aperture mechanism 74 and is able to rotate relative thereto while being held securely in the plane of the base plate 72. The pan drive belt 84 connected around the circumference of the pan mount 80 is also connected to the pan servo motor 70 so that rotation of the pan servo motor 70 causes the pan mount 80 to rotate thus, causing the video camera 66 to rotate.

Tilt capability allows the video camera 66 to tilt in a single plane relative to the Z axis, as shown by the angle labeled with the Greek symbol Beta. The tilt mount 82 does not rotate relative to the pan mount 80 but remains rotatably fixed relative thereto. Two support studs or pivot points 94 may connect the tilt mount 82 to the pan mount 80 along opposite points along the diameter of each mount. This allows the tilt mount 82 to tilt relative to the plane defined by the pan mount 80 thus, allowing the camera 66 retained within tilt mount to tilt therewith. When the tilt servo motor 68 is activated, a gear mounted thereto rotates and provides forward and backward movement to the tilt tie rod 86. The tilt tie rod 86, in turns forces the tilt mount 82 to pivot relative to the pivot points 94.

Manual roll capability also allows the video camera 66 to roll with respect to the base plate 72. Roll essentially allows the tilt mount 82 to pivot slightly, but along an axis displaced ninety degrees from the tilt pivot points 94. The roll mount 88 and roll adjustment mechanism 90 allow such displacement. Two support studs or pivot points 96 may connect the manual roll mount 90 to the tilt mount 82 along opposite points along the diameter of the mounts. This allows the roll mount 90 to roll relative to the plane defined by the tilt mount 82 thus, allowing the camera 66 retained within the roll mount to roll therewith. This mounting mechanism is essentially a triple-gimbal suspension which is well known to those skilled in the art and any suitable mechanism allowing adequate camera positioning may be used. Although not explicitly shown, the roll adjustment 88 or roll mount 90 may be responsive to a remotely controlled receiver such that an operator located at the base station 12 may remotely control the roll of the camera 66.

Referring now to FIGS. 1 and 2, the camera subsystem 50 also includes a tilt/pan transmitter 102 and receiver 104. The tilt servo motor 68 and the pan servo motor 70 are both responsive to the wireless tilt/pan receiver 104 which receives commands from the wireless tilt/pan transmitter 102 located at the base station 12. The tilt/pan receiver 104 and transmitter 102 may for example, be a Model PCM 1024 radio controlled receiver-transmitter manufactured by Futaba Corporation. The tilt/pan transmitter 102 uses radio frequency energy to remotely transmit commands to the tilt/pan receiver 104 where commands entered by an operator at the base station 12 are transmitted to the camera receiver 104 to control movement of the camera 66.

A video subsystem 116, shown in dashed lines, includes a video distribution amplifier 118, an on-board video cassette recorder (VCR) 120, a VCR wired remote control unit 122, and a wireless video transmitter 124. These devices are mounted in the car 14. The base station 12 portion of the video subsystem 116 includes a video wireless receiver 126, a video monitor 128, and an optional base station VCR 130.

The video distribution amplifier 118 receives its signal from the video camera 66 and splits the video signal into two identical video signals. One of the video signals is directed into the on-board VCR 120 such that all video images captured by the video camera are permanently recorded on video tape. The other video signal is directed to tile video transmitter 124 for transmission to the base station video receiver 126. This allows personnel at the base station 12 to monitor the video images in real time so that corrections to the car's propulsion system 16 and camera subsystem 50 may be made in response to the video images viewed on the video monitor 128. The video distribution amplifier 118 may for example, be a Model VB/VDA video distribution amplifier manufactured by Video Accessory Corporation. The on-board VCR 120 for example, may be a Model TR400 Hi8 video camcorder manufactured by Sony Corporation where the camera portion of the camcorder remains unused.

Although the video monitor disclosed may be a known television-type device, any system for displaying images may be used. For example, raster-scan devices, liquid crystal displays, electro-luminescence devices, oscilloscope-type devices, or any other suitable device may be used. Additionally, although the wireless receiver-transmitter devices 36, 38, 102, 104, 124, and 126 disclosed may be known radio-frequency wireless devices, any devices capable of transmitting information without physical connections in a wireless manner may be used. For example, infra-red devices, acoustic devices, laser light devices, or any other suitable device may be used.

To accommodate the above-described devices, the car 14 may be modified to increase its structural integrity and weight-carrying capability. For example, suspension springs may be replaced with heavier-duty suspension springs to accommodate the increase in weight. Additionally, shock absorber pistons may be fitted with special valves and heavy-duty shock absorber oil may be used.

A dust-resistant compartment 140, shown in dashed lines, is constructed to fit within the chassis of the car 14 to house the on-board VCR 120 and to provide impact protection. Such a compartment 140 is important since the car 14 is typically operated on surfaces such as dirt roads and off-road terrain where dust and particulate matter could contaminant an unprotected VCR 120.

To manually control the on-board VCR 120 without opening the dust-resistant compartment 140, the remote control unit 122 is attached to the on-board VCR through a wire assembly which is routed through the dust-resistant compartment 140. The remote control unit 122 is affixed to the top of the car 14 for easy manual access. The wired remote control unit 122 is used when setting the VCR 120 to record just prior to shooting. The remote control unit 122 for example, may be a Model RM95N Remote Commander manufactured by Nikon Corporation.

The video transmitter 124 receives real time video images from the camera 66 and transmits the images to the video receiver 126 at the base station 12. The video transmitter 124 and receiver 126 for example, may be a Model 2000 video transmitter and receiver manufactured by Modulus Corporation. Video images received by the video receiver 126 are displayed on the video monitor 128 and are simultaneously recorded on the base station VCR 130.

Alternatively, only a single VCR 120 or 130 may be used. For example, the on-board VCR 120 or the base station VCR 130 may be used. Two VCRs are not essential and one may be omitted. However, use of two VCRs increases safety by providing a redundant feature in case of device failure. Additionally, use of the base station VCR 130 permits use of a higher quality VCR since such high quality VCRs are typically much larger than VCRs capable of fitting inside the car.

Although the VCRs 120 and 130 herein disclosed may be known video cassette recorders which record information on magnetic tape, any system for storing information may be used. For example, optical disk storage, computer disk storage, semiconductor memory storage, or any other suitable storage device may be used.

A 12 volt rechargeable battery pack 142 may be constructed from ten ganged Sanyo 1200 milliamp 1.2 volt nickel-cadmium batteries. The 12 volt battery pack 142 supplies electrical power to the portion of the camera subsystem 50 and video subsystem 116 contained within the car 14. The 12 volt battery 142 is mounted within the car 14 and is securely affixed there within. All electronic components of the camera subsystem 50 and the video subsystem 116 are available from various manufacturers and may be adapted by those skilled in the art for inclusion in the race car kit.

Additionally, the invention 10 incorporates an air blower system 144 to keep the camera lens 77 clear of dirt and dust during shooting. This is an important feature since the relatively low position of the lens 77 may cause dust and dirt to accumulate on the lens when the action occurs on non-paved surfaces. A blower fan 162 mounted to the outside of the car 14 provides a source of air flow. A suitably dimensioned tube 164, such as a tube constructed from rubber or plastic is attached to the blower fan 162 while the other end of the tube is secured proximal to the camera lens 77 by suitable brackets 166 or other fasteners. The constant flow of air across the camera lens 160 removes dust and particulate matter.

Although the vehicle 14 disclosed is a toy race car, the present invention may use any other type of vehicle capable of being directed in a controlled manner and able to transport the devices disclosed above. For example, a train, a truck, a boat, a helicopter, an airplane or any other suitable vehicle may be used.

In operation, the invention 10 is used at an exterior location such as an open expanse of land with hard-packed earthen paths, small hills of dirt, and scattered obstacles such as fallen logs and small boulders. Three operators are typically involved in the operation of the invention 10 and the video recording procedure. A first operator, referred to as the camdriver (camera car driver), remotely controls the camera car 14 through use of the car transmitter 38 thereby propelling and steering the car. A second operator, referred to as the cameraman, controls the camera module 52 via the tilt/pan transmitter to obtain the best possible view of the target car to be recorded. A third operator, referred to as the target driver, controls the target car through a separate and independent remote control system and race car (not shown). However, the invention 10 may be used to capture real time full motion video images of any subject whose speed and maneuverability does not exceed the capabilities of the camera car 14.

The three operators and the director of the production are typically located at the base station 12. The director instructs the target driver where the target car should travel through the environment. Instructions to the camdriver indicate how the camera car 14 should be driven in relation to the target car's path of travel. Further instructions to the cameraman indicate how the camera module 52 should be panned and tilted to obtain the desired video images.

When the three operators are prepared, an assistant activates the power on the target car and also activates the propulsion subsystem 16 and video components of the camera car 14. The on-board VCR 120 is then set to record by using the remote control unit 122 wired to the VCR. The above-described actions initiate transmission of real time video images from the video camera 66 to the on-board VCR 120. Simultaneously, the real time video images are sent to the video transmitter 124 which transmits the images to the video receiver 126 at the base station 12. The video receiver 126 at the base station 12 is connected to the video monitor 128 where the operators and the director may watch the real time video images. By manipulating the car transmitter 38 and the camera pan/tilt transmitter 102, the most desirable action may be shot. The video signal may also be recorded by the base station VCR 130 in addition to or as an alternative to use of the on-board VCR 120.

As the target driver directs the target car along its intended path through the environment, the camdriver directs the camera car 14 along its intended path as the cameraman adjusts the pan and tilt controls so that the camera frames the desired images. Throughout the production sequence, the air blower system 144 continuously directs a stream of air across the front of the camera lens 76 to prevent objectionable accumulation of dust and dirt in front of the lens.

When the desired action sequence has been recorded, the camera car 14 and the target car are directed back to the starting positions. The assistant may then halt recording of the on-board VCR 120 and remove the video cassette by opening the dust-resistant compartment 140. Power is then removed from all vehicles.

A specific embodiment of the system for producing real time full motion video images of a toy race car according to the present invention has been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A vehicle video production system for creating full-motion real time video images of a target vehicle, the system comprising:

a miniature vehicle;

a first wireless transmitter;

a first wireless receiver operatively coupled to the miniature vehicle and configured to control movement of the miniature vehicle in response to signals received from the first wireless transmitter;

a video camera attached to the miniature vehicle for generating real-time video images of the target vehicle;

a camera controller connected to the video camera to control movement of the video camera relative to the miniature vehicle;

a second wireless transmitter;

a second wireless receiver operatively coupled to the camera controller and configured to control movement of video camera in response to signals received from the second wireless transmitter;

a video recorder operatively coupled to the video camera configured to record the real time video images generated by the video camera, the video recorder operatively mounted in the miniature vehicle; and a video display device operatively coupled to the video camera for displaying the real time video images where movement of the miniature vehicle and movement of the video camera are controlled in real time in response to the video images displayed on the display device to obtain optimal video images of the target vehicle.

2. The apparatus according to claim 1 further including an air blower mounted to the miniature vehicle for directing a stream of air across a lens of the video camera to prevent the accumulation of dust and particles.

3. The apparatus according to claim 1 wherein the camera controller controls pan and tilt of the video camera.

4. The apparatus according to claim 1 wherein the video recorder is mounted within in a dust-resistant compartment in the miniature vehicle.

5. The apparatus according to claim 1 further including at least one break-away mount for releasably attaching the video camera to the miniature vehicle such that the video camera separates from the miniature vehicle when acted upon by a force greater than a predetermined value.

6. The apparatus according to claim 1 wherein the miniature vehicle is a toy racing car.

7. The apparatus according to claim 1 wherein the first and second wireless transmitters and the first and second wireless receivers operate in the radio frequency spectrum.

8. The apparatus according to claim 1 further including a wireless video transmitter operatively coupled to the video camera for transmitting video images generated by the video camera.

9. The apparatus according to claim 8 further including a wireless video receiver for receiving the transmitted video images where the video images are displayed on the video display in real time.

10. The apparatus according to claim 1 wherein the target vehicle is a toy racing car.

11. The apparatus according to claim 10 wherein movement of the target vehicle is controlled by a wireless remote control device.

12. A video production system for creating full-motion real time video images of a target vehicle, the system comprising:

an observer vehicle;

first means for transmitting information remotely;

first means for receiving information remotely, operatively coupled to the observer vehicle and configured to control movement of the observer vehicle in response to signals received from the first means for transmitting;

means for generating real-time video images of the target vehicle, said means being mounted to the observer vehicle;

means for controlling the generating means and operatively coupled thereto for directing the movement of the means for generating real-time video images, relative to the observer vehicle;

second means for transmitting information remotely;

second means for receiving information remotely, operatively coupled to the means for controlling and configured to control movement of the means for generating real-time video images, said means for controlling responsive to signals received from the second means for transmitting;

means for recording the real-time video images operatively coupled to the means for generating, said means for recording facilitating recording of the real time video images, the means for recording operatively mounted in the observer vehicle; and means for displaying operatively coupled to the means for generating, for displaying the real time video images where movement of the observer vehicle and movement of the means for generating are controlled in real time in response to the video images displayed such that optimal video images of the target vehicle are obtained.

13. The apparatus according to claim 12 further including at least one releasing means for releasably attaching the means for generating real-time video images to the observer vehicle such that the means for generating real-time images separates from the observer vehicle when acted upon by a force greater than a predetermined value.

14. The apparatus according to claim 12 wherein movement of the observer vehicle is controlled by wireless remote control device in communication with the first means for receiving information.

15. The apparatus according to claim 12 wherein the first and second means for transmitting information and the first and second means for receiving information remotely operate in the radio frequency spectrum.

16. The apparatus according to claim 12 further including means for remotely transmitting video images operatively coupled to the means for generating, for transmitting the generated video images.

17. The apparatus according to claim 16 further including means for receiving the transmitted video images where the video images are displayed on the means for displaying in real time.

18. The apparatus according to claim 16 further including means for receiving the transmitted video images where the video images are recorded on the means for recording in real time.

19. A vehicle video production system for creating full-motion real time video images of a target vehicle, the system comprising:

a miniature vehicle;

a first wireless transmitter;

a first wireless receiver operatively coupled to the miniature vehicle and configured to control movement of the miniature vehicle in response to signals received from the first wireless transmitter;

a video camera attached to the miniature vehicle for generating real-time video images of the target vehicle, the video camera releasably attached to the miniature vehicle by at least one break-away mount permitting separation of the video camera from the miniature vehicle when acted upon by a force greater than a predetermined value;

a camera controller connected to the video camera to control movement of the video camera relative to the miniature vehicle;

a second wireless transmitter;

a second wireless receiver operatively coupled to the camera controller and configured to control movement of video camera in response to signals received from the second wireless transmitter;

a video recorder operatively coupled to the video camera configured to record the real time video images generated by the video camera; and a video display device operatively coupled to the video camera for displaying the real time video images where movement of the miniature vehicle and movement of the video camera are controlled in real time in response to the video images displayed on the display device to obtain optimal video images of the target vehicle.

* * * * *

UNITED STATES PATENT AND TRADEMARK OFFICE
CERTIFICATE OF CORRECTION

PATENT NO. : 5,555,019
DATED : September 10, 1996
INVENTOR(S) : Kevin Dole

It is certified that error appears in the above-indentified patent and that said Letters Patent is hereby corrected as shown below:

Column 3, line 31, delete ", shown in dashed lines,".

Column 4, line 10, delete "also shown in dashed lines".

Column 5, line 63, delete ", shown in dashed lines,".

Column 6, line 39, delete ", shown in dahsed lines,".

Column 7, line 33, delete "160" and insert --77--.

Signed and Sealed this

Twenty-fifth Day of March, 1997

Attest:

BRUCE LEHMAN

Attesting Officer

Commissioner of Patents and Trademarks